(12) United States Patent
Koyanagi et al.

(10) Patent No.: US 11,729,330 B2
(45) Date of Patent: *Aug. 15, 2023

(54) IMAGE READING APPARATUS

(71) Applicant: SEIKO EPSON CORPORATION, Tokyo (JP)

(72) Inventors: Noriyuki Koyanagi, Kitakyushu (JP); Tokujiro Okuno, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/664,527

(22) Filed: May 23, 2022

(65) Prior Publication Data

US 2022/0286574 A1    Sep. 8, 2022

Related U.S. Application Data

(63) Continuation of application No. 17/087,331, filed on Nov. 2, 2020, now Pat. No. 11,343,399, which is a
(Continued)

(30) Foreign Application Priority Data

Feb. 12, 2015    (JP) .................................. 2015-025473

(51) Int. Cl.
    *G06F 3/12*    (2006.01)
    *H04N 1/00*    (2006.01)

(52) U.S. Cl.
    CPC ....... *H04N 1/00822* (2013.01); *H04N 1/0057* (2013.01); *H04N 1/00716* (2013.01);
    (Continued)

(58) Field of Classification Search
    CPC .......... H04N 1/00822; H04N 1/00806; H04N 1/00811; H04N 1/00716; H04N 1/00729;
    (Continued)

(56) References Cited

U.S. PATENT DOCUMENTS 6,233,068 B1    5/2001   Kondo
10,863,046 B2 * 12/2020  Koyanagi ............ H04N 1/0057
(Continued)

FOREIGN PATENT DOCUMENTS

JP    11-052635    2/1999
JP    2003-087500  3/2003
(Continued)

*Primary Examiner* — Huo Long Chen
(74) *Attorney, Agent, or Firm* — Workman Nydegger

(57) ABSTRACT

An image reading apparatus includes a transport unit which transports a document, and reading units which read an image of the document which is transported. It is assumed that an operation of reading an image when specific setting information is not input to a control device of the image reading apparatus is set to a first reading mode, and an operation of reading an image when specific setting information is input to the control device is set to a second reading mode. In this case, in the second reading mode, image data of an image with a resolution which is equal to that in the first reading mode is generated, while causing the reading units to read an image from a document which is transported by the transport device at a lower speed than that in the first reading mode.

10 Claims, 8 Drawing Sheets

Related U.S. Application Data continuation of application No. 16/117,222, filed on Aug. 30, 2018, now Pat. No. 10,863,046, which is a continuation of application No. 15/042,000, filed on Feb. 11, 2016, now Pat. No. 10,091,375.

(52) U.S. Cl.
CPC ..... *H04N 1/00729* (2013.01); *H04N 1/00806* (2013.01); *H04N 1/00811* (2013.01); *H04N 2201/0081* (2013.01)

(58) Field of Classification Search
CPC ......... H04N 1/0057; H04N 2201/0081; H04N 1/00602; H04N 1/00801
See application file for complete search history.

(56) References Cited

U.S. PATENT DOCUMENTS

| | | | |
|---|---|---|---|
| 11,343,399 B2* | 5/2022 | Koyanagi | H04N 1/00822 |
| 2002/0036807 A1 | 3/2002 | Terashima et al. | |
| 2007/0171488 A1 | 7/2007 | Chen et al. | |
| 2008/0007801 A1 | 1/2008 | Yotsuyanagi | |
| 2008/0114903 A1 | 5/2008 | Tadokoro et al. | |
| 2008/0224392 A1 | 9/2008 | Oshima | |
| 2009/0135457 A1 | 5/2009 | Okada et al. | |
| 2009/0166961 A1 | 7/2009 | Namikawa | |
| 2009/0230611 A1 | 9/2009 | Ngai | |
| 2010/0110499 A1 | 5/2010 | Baba | |
| 2010/0231991 A1 | 9/2010 | Nakajima | |
| 2011/0278786 A1 | 11/2011 | Yamagishi et al. | |
| 2013/0003136 A1 | 1/2013 | Osakabe et al. | |
| 2013/0057932 A1* | 3/2013 | Mukai | H04N 1/00989 358/498 |
| 2013/0278980 A1* | 10/2013 | Janssen | H04N 1/00806 358/513 |
| 2014/0079460 A1 | 3/2014 | Kanaya | |
| 2015/0373209 A1 | 12/2015 | Aizono | |
| 2016/0241731 A1 | 8/2016 | Koyanagi et al. | |

FOREIGN PATENT DOCUMENTS

| | | |
|---|---|---|
| JP | 2003-128298 | 5/2003 |
| JP | 2005-094688 | 4/2005 |
| JP | 2009-111906 | 5/2006 |
| JP | 2009-161292 | 7/2009 |
| JP | 2009-229628 | 10/2009 |
| JP | 2010-114578 | 5/2010 |
| JP | 2012-068293 | 4/2012 |
| JP | 2013-023307 | 2/2013 |

* cited by examiner

FIG. 3

FIRST READING MODE

| MODE | TRANSPORT SPEED | RESOLUTION |
|---|---|---|
| FIRST MODE | HIGH | LOW |
| SECOND MODE | INTERMEDIATE | INTERMEDIATE |
| THIRD MODE | LOW | HIGH |

IMAGE READING APPARATUS

The present application is a continuation of U.S. patent application Ser. No. 17/087,331, filed Nov. 2, 2020, which is a continuation of U.S. patent application Ser. No. 16/117,222, filed Aug. 30, 2018 and granted Dec. 8, 2020 as U.S. Pat. No. 10,863,046, which is a continuation of U.S. patent application Ser. No. 15/042,000, filed Feb. 11, 2016 and granted on Oct. 2, 2018 as U.S. Pat. No. 10,091,375, which claims priority to Japanese Patent Application No. 2015-025473, filed Feb. 12, 2015. All foregoing applications are expressly incorporated by reference herein.

BACKGROUND

1. Technical Field

The present invention relates to an image reading apparatus including a reading unit which reads an image of the original document which is transported using a transport unit.

2. Related Art

In JP-A-2003-128298, an example of an image reading apparatus which transports the original document which is set in a setting unit to a predetermined reading position, and reads an image of the original document which is transported to the same reading position using a reading unit is described.

Meanwhile, when transporting a color document, a transport failure such as paper jam easily occurs compared to a case of transporting a monochrome document. Therefore, in the image reading apparatus which is described in JP-A-2003-128298, when reading an image of a color document, transporting of the document is performed at a low speed compared to a case of reading an image of a monochrome document. Specifically, in a control device of an image reading apparatus, when information based on a user operation is input, whether it is reading of an image of a color document or reading of an image of a monochrome document is determined. In addition, when it is reading of an image of a monochrome document, a normal transport mode is selected, and when it is reading of an image of a color document, a transport mode of which a transport speed is lower than that of the normal transport mode is selected. A transport unit is operated using a transport mode which is selected in this manner.

Meanwhile, there is a case in which images of various documents with different thickness are read in an image reading apparatus. When transporting a thin document, a transport failure such as paper jam easily occurs compared to a case when a thick document is transported. Therefore, when reading an image of a thin document, it is preferable to transport the document at a low speed compared to a case of reading an image of a thick document.

However, in an image reading apparatus which reads an image of a document which is transported by a transport unit using a reading unit, in general, there is correlation between the transport speed of the document and the resolution of an obtained image.

Specifically, when a transport speed of a document is low, image data as image data with high resolution is generated. For this reason, when changing a transport speed of a document according to the thickness of the document, image data which is generated is not limited to image data with a resolution which is desired by a user.

SUMMARY

An advantage of some aspects of the invention is to provide an image reading apparatus which can generate data of an image with a resolution which is desired by a user, even when a transport speed of a document is variable.

According to an aspect of the invention, there is provided an image reading apparatus which includes a transport unit which transports a document; a reading unit which reads an image of the document which is transported by the transport unit; and a control unit which generates image data as data of the image which is read by the reading unit, in which, as operation modes for performing reading in the reading unit, there are a first reading mode and a second reading mode in which resolutions of the generated image data are the same, and transport speeds are different from each other, and the control unit transports the document at a low speed when reading the document in the second reading mode compared to a case in which the document is read in the first reading mode.

According to the configuration, image data items with the same resolution are generated in both the cases of reading in the first reading mode and the second reading mode. Accordingly, even when a document is transported at a different transport speed, it is possible to provide a user with data of an image with a resolution which is desired by the user.

In addition, when image reading is instructed in a circumstance in which specific setting information is input to the control unit, the second reading mode is executed. That is, when a user recognizes that a document is thin, image reading is instructed to an image reading apparatus by a user after a user operation such as inputting of the above described specified setting information to the control unit is performed. At this time, although the document is transported at a lower speed than that in the first reading mode, image data of an image with the same resolution as that in the first reading mode is generated. That is, it is possible to provide image data which is independent from a transport speed of a document to a user while suppressing a transport failure such as a paper jam. Accordingly, even when a transport speed of a document is variable, it is possible to generate data of an image with a resolution which is desired by a user.

In the image reading apparatus, it is preferable that the control unit switches a reading mode to be executed from the first reading mode to the second reading mode when starting reading of an image of the subsequent document of one document, in a case in which the specific setting information is input in the middle of transporting the one document in each of the documents using the transport unit when continuously reading images of a plurality of documents.

According to the configuration, when the above described specific setting information is input to the control unit in the middle of transporting of one document in each document at a time of continuously reading images of a plurality of documents, the first reading mode is continued until reading of an image of the one document is completed. That is, a reading mode is not changed in the middle of transporting one document, and a transport speed of the document is not changed. For this reason, it is possible to suppress an increase in control load which is caused by switching of a reading mode in the middle of reading of an image.

Thereafter, when reading of an image of the subsequent document is performed, the second reading mode is executed instead of the first reading mode. That is, when reading an image of a document after one document, the document is transported at a low speed. Moreover, since it is the second reading mode, image data as data of an image with the same resolution as that in the first reading mode is generated, even when a document is transported at a low speed. Accordingly, when reading an image of a document after the one document, it is possible to provide image data which is independent from a transport speed to a user while suppressing the occurrence of a transport failure of the document by transporting the document at a low speed.

In the image reading apparatus, it may be possible to set an operation mode of reading a document with a first thickness to the first reading mode, and an operation mode of reading a document with a second thickness which is thinner than the document with the first thickness to the second reading mode.

According to the configuration, when a document which is transported by the transport unit is not thin, the first reading mode is executed. In addition, when a user instructs reading of an image of a document to the image reading apparatus, the resolution of the image based on image data to be generated can be selected by the user. For this reason, it is possible to provide a user with data of an image with a resolution which is desired by the user.

On the other hand, when a document which is transported by the transport unit is thin, the second reading mode is executed. In this case, although the document is transported at a lower speed than that in the first reading mode, data of an image with the same resolution as that in the first reading mode is generated.

That is, it is possible to provide image data which is independent from a transport speed of a document to a user while suppressing a transport failure such as paper jam. Accordingly, even when a transport speed of a document is variable, it is possible to generate data of an image with a resolution which is desired by the user.

It is preferable that the image reading apparatus further includes a sonic wave sensor which outputs a sonic wave to a document which is transported by the transport unit, and detects an attenuation rate of the sonic wave, and the control unit determines that the document which is transported by the transport unit is thin when an attenuation rate of a sonic wave which is detected by the sonic wave sensor under a circumstance in which the document is transported by the transport unit is less than a determining attenuation rate, and executes the second reading mode.

When a document is thin, an attenuation rate of a sonic wave which is detected by the sonic wave sensor tends to be small. Therefore, in the above described configuration, when an attenuation rate of a sonic wave which is detected by the sonic wave sensor is less than a determining attenuation rate, the second reading mode is executed, since it is possible to determine that a document which is transported is thin. It is possible to execute the second reading mode by automatically selecting the mode, using a detection result which is obtained by using the sonic wave sensor in this manner.

In the image reading apparatus, it is preferable that the sonic wave sensor is a sensor which detects whether or not a plurality of documents are transported by being overlapped, a multi-feeding detecting attenuation rate which is larger than the determining attenuation rate is provided as a threshold value for determining whether or not a plurality of documents are transported by being overlapped, the control unit executes the first reading mode when an attenuation rate of a sonic wave which is detected by the sonic wave sensor under a circumstance in which a document is transported by the transport unit is the determining attenuation rate or more, and less than the multi-feeding detecting attenuation rate, and stops transporting of a document using the transport unit and reading of an image using the reading unit, when an attenuation rate of a sonic wave which is detected by the sonic wave sensor under a circumstance in which a document is transported by the transport unit is the multi-feeding detecting attenuation rate or more.

When a plurality of documents are transported by being overlapped, an attenuation rate of a sonic wave which is detected by a sonic wave sensor tends to be large compared to a case in which only one document is transported. In addition, an attenuation rate of a sonic wave in a case in which two thin documents are overlapped becomes larger than an attenuation rate of a sonic wave in a case in which one document which is not thin is transported. Therefore, according to the above described configuration, a multi-feeding detecting attenuation rate which is a threshold value for determining whether or not a plurality of documents are transported by being overlapped is determined to be a value which is larger than the determining attenuation rate. In addition, by using the multi-feeding detecting attenuation rate, it is possible to determine whether one document which is not thin is transported, or a plurality of documents are transported by being overlapped. In addition, by adopting such a determination result, it is possible to appropriately drive the image reading apparatus according to a circumstance.

In the image reading apparatus, it is preferable that the transport unit includes a pair of transport rollers which is located on the upstream side in a transport direction of a document compared to the reading unit, and a feeding roller which is arranged on the upstream side in the transport direction of a document compared to the pair of transport rollers, and feeds the document toward the pair of transport rollers, and the sonic wave sensor is arranged between the feeding roller and the pair of transport rollers in the transport direction of the document.

According to the configuration, it is possible to determine whether or not a document which is transported is thin on the upstream side of the reading unit in the transport direction.

In the image reading apparatus, it is preferable that the control unit switches a reading mode to be executed from the second reading mode to the first reading mode, when a predetermined ending condition is satisfied under a circumstance in which the second reading mode is selected.

According to the configuration, when it is not necessary to execute the second reading mode, a mode can be switched from the second reading mode to the first reading mode.

In the image reading apparatus, it is preferable that the control unit switches a reading mode to be executed at a time of reading the subsequent image from the second reading mode to the first reading mode, when setting information for ending the second reading mode is input under a circumstance in which the second reading mode is selected.

According to the configuration, when setting information which denotes that executing of the second reading mode is not necessary is input, it is possible to execute the first reading mode when reading the subsequent image.

In the image reading apparatus, it is preferable that the control unit switches a reading mode to be executed from the second reading mode to the first reading mode, when starting reading of an image based on the subsequent job under a circumstance in which the second reading mode is selected.

According to the configuration, it is possible to automatically execute the first reading mode when reading an image based on the subsequent job.

BRIEF DESCRIPTION OF THE DRAWINGS

The invention will be described with reference to the accompanying drawings, wherein like numbers reference like elements.

FIG. 3 is a table for describing a plurality of first reading modes.

DESCRIPTION OF EXEMPLARY EMBODIMENTS

First Embodiment

Hereinafter, a first embodiment in which an image reading apparatus is embodied will be described according to FIGS. 1 to 5.

Figure 1:
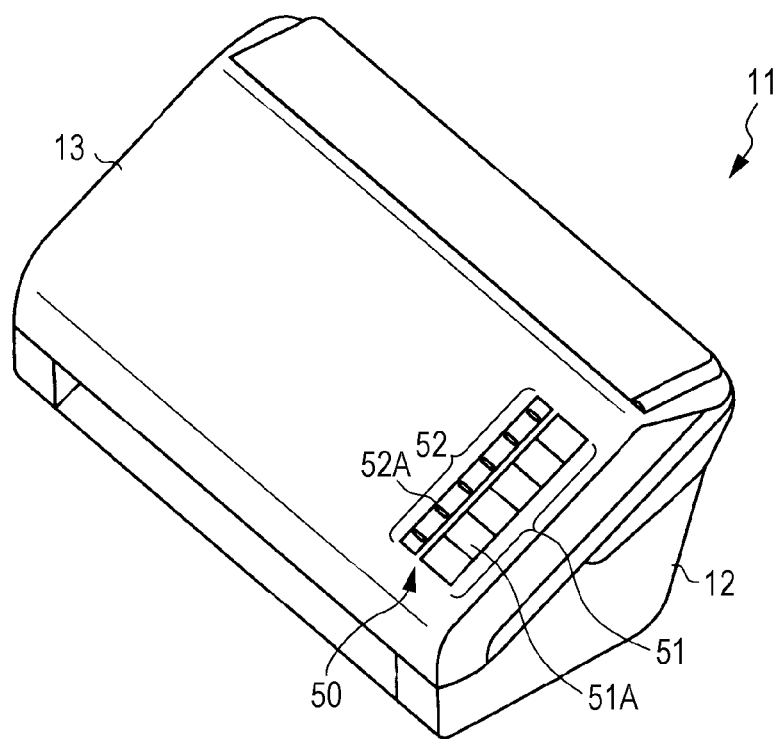
FIG. 1 is a perspective view which illustrates a schematic configuration of a first embodiment of an image reading apparatus.

As illustrated in FIG. 1, an image reading apparatus 11 according to the embodiment includes a housing 12, and a cover member 13 which is rotatably supported by the housing 12. A user interface 50 of the apparatus is provided in the cover member 13. That is, the user interface 50 includes a plurality of buttons 51, and a plurality of lamps 52.

One button of each of the buttons 51 is a specifying button 51A which is operated when instructing an execution of reading of an image in the second reading mode which will be described later. In addition, one lamp of each of the lamps 52 is a specifying lamp 52A which is turned on when the specifying button 51A enters the ON-state. In addition, the specifying lamp 52A is turned off when the specifying button 51A enters the OFF-state.

Figure 2:
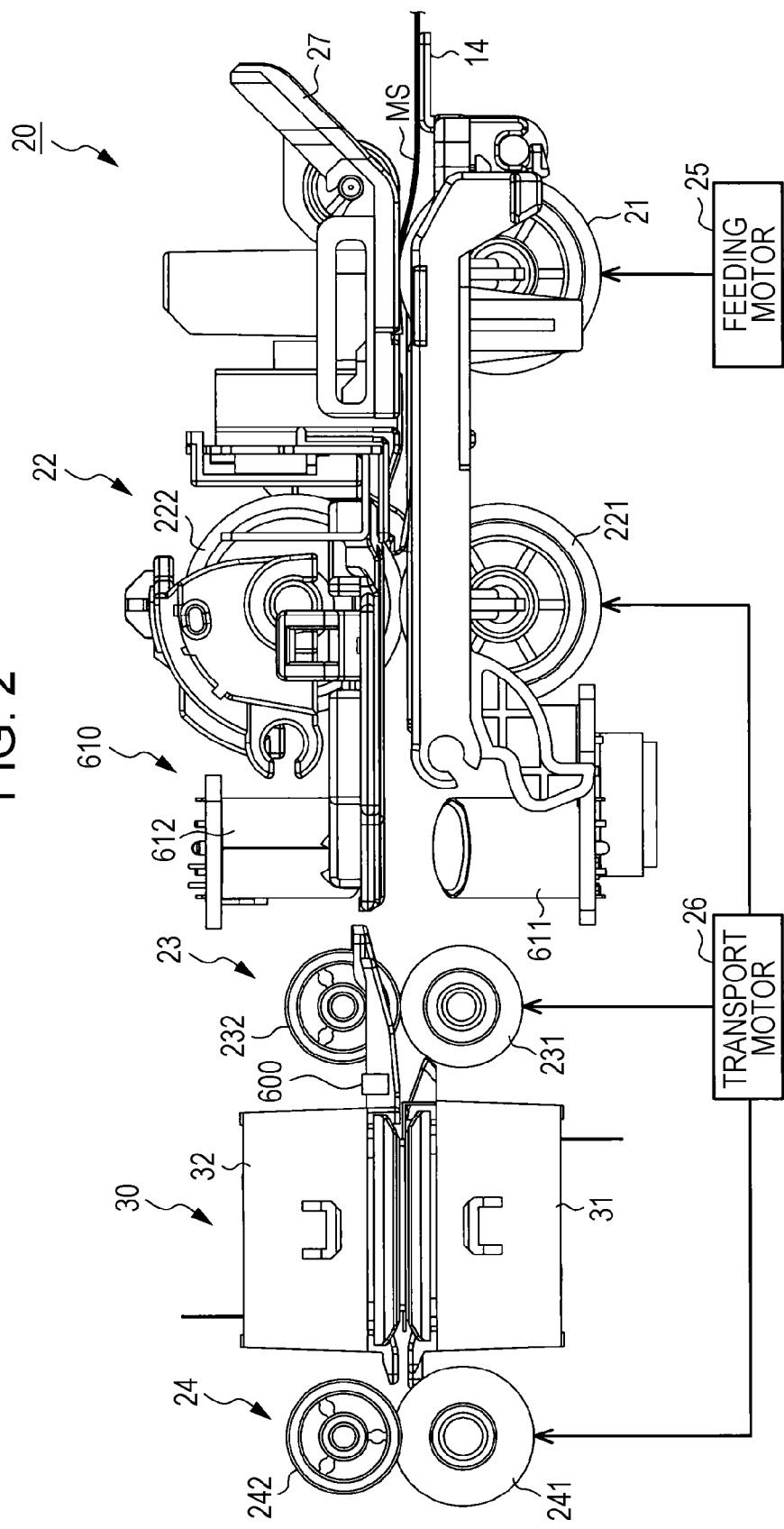
FIG. 2 is a side view which illustrates a transport device, and peripheral members of the transport device of the image reading apparatus.

In addition, as illustrated in FIG. 2, a setting unit 14 in which a document MS on which reading of an image is not performed yet is set is provided in the image reading apparatus 11. When a plurality of documents MS are set in the setting unit 14, each document MS is stacked on the setting unit 14. In addition, a transport device 20 as a transport unit which transports the document MS, and a reading device 30 which reads an image of the document MS which is transported by the transport device 20 are provided inside the housing 12.

In addition, the document MS which is set in the setting unit 14 enters into the housing 12 one by one, and is transported along a predetermined transport path. In addition, an image of the document MS is read while being transported, and the document MS of which the image is read is discharged to the outside of the housing 12.

As illustrated in FIG. 2, the transport device 20 includes a feeding roller 21, a pair of feeding rollers 22, a pair of transport rollers 23, and a pair of discharging rollers 24 which are arranged in order from the upstream side to the downstream side in the transport direction of the document MS. In addition, the transport device 20 includes a feeding motor 25 and a transport motor 26 as driving sources for transporting the document MS. A driving force from the feeding motor 25 is transmitted to the feeding roller 21, and a driving force from the transport motor 26 is transmitted to the pair of feeding rollers 22, the pair of transport rollers 23, and the pair of discharging rollers 24.

The feeding roller 21 feeds the lowermost document MS in the plurality of documents MS which are set in the setting unit 14 to the inside of the housing 12. In addition, a guiding member 27 is arranged on the upper part of the feeding roller 21. Due to the guiding member 27, entering of a document other than the lowermost document MS into the housing 12 is suppressed.

The pair of feeding rollers 22 includes a driving roller 221 which is connected to the transport motor 26 in a driving manner, and a driven roller 222 to which a driving force from the transport motor 26 is transmitted through the driving roller 221. In addition, when the driving roller 221 and the driven roller 222 rotate, the document MS is interposed between both the rollers 221 and 222, and is sent toward the pair of transport rollers 23.

The driven roller 222 of the pair of feeding rollers 22 is a retarding roller to which a constant rotation load is applied using a torque limiting mechanism such as a torque limiter. For this reason, when the plurality of documents MS are fed into the housing 12 from the setting unit 14 in an overlapped state, only one document MS is sent to the downstream side in the transport direction due to the pair of feeding rollers 22. In this point, two rollers 221 and 222 which configure the pair of feeding rollers 22 function as the "feeding roller" which sends the document MS toward the pair of transport rollers 23.

The pair of transport rollers 23 is arranged on the upstream side in the transport direction which is the right side in the figure compared to the reading device 30. Such a pair of transport rollers 23 includes a driving roller 231 which is connected to the transport motor 26 in a driving manner, and a driven roller 232 to which a driving force from the transport motor 26 is transmitted through the driving roller 231. In addition, when the driving roller 231 and the driven roller 232 rotate, the document MS is interposed between both the rollers 231 and 232, and is sent toward the reading device 30.

The pair of discharging rollers 24 is arranged on the downstream side in the transport direction which is the left side in the figure compared to the reading device 30. Such a pair of discharging rollers 24 includes a driving roller 241 which is connected to the transport motor 26 in a driving manner, and a driven roller 242 to which a driving force from the transport motor 26 is transmitted through the driving roller 241. In addition, when the driving roller 241 and the driven roller 242 rotate, the document MS is interposed between both the rollers 241 and 242, and is discharged to the outside of the housing 12.

The reading device 30 includes two reading units 31 and 32 which interpose the document MS which is transported along the transport direction therebetween, and are arranged on vertical both sides. In each reading unit 31 and 32, a reading unit on the lower side is a first reading unit 31, and a reading unit on the upper side is a second reading unit 32. That is, the first reading unit 31 reads an image on one face (lower face in figure) of the document MS, and the second reading unit 32 reads an image on the other face (upper face in figure) of the document MS. In addition, as the reading unit, for example, there is a Contact Image Sensor Module (CISM). As a matter of course, another module may be adopted as the reading unit, in addition to the CISM.

In addition, as illustrated in FIG. 2, an end portion detecting sensor 600 which detects an end portion of the document MS is provided between the reading device 30 and the pair of transport rollers 23 in the transport direction of the document MS.

In addition, a multi-feeding detecting sensor 610 which detects the fact that a plurality of documents MS are transported in an overlapped state is provided between the pair of feeding rollers 22 and the pair of transport rollers 23 in the transport direction of the document MS. The multi-feeding detecting sensor 610 is a sonic wave sensor, and includes an output unit 611 which outputs a sonic wave, and an input unit 612 to which the sonic wave output from the output unit 611 is input. In addition, one of the output unit 611 and the input unit 612 is arranged on the upper part in the figure compared to document MS which is transported along the transport direction, and the other is arranged on the lower part in the figure compared to document MS which is transported along the transport direction. In the example which is illustrated in FIG. 2, the input unit 612 is arranged on the upper part in the figure, and the output unit 611 is arranged on the lower part in the figure.

In addition, the multi-feeding detecting sensor 610 detects an attenuation rate α of a sonic wave. When an output value of a sonic wave which is output from the output unit 611 is set to "X1", and an input value which is input to the input unit 612 is set to "X2", the attenuation rate α is a value which can be calculated using the following relational expression (expression 1).

$$\alpha = (X1-X2)/X1 \quad \text{(expression 1)}$$

Meanwhile, in the image reading apparatus 11 according to the embodiment, a user can select a resolution of an image based on image data which is output from the apparatus. That is, it is possible to select a first reading mode as an example of a reading mode of an image through an operation of the user interface 50 by a user, or an operation of an external device which communicates with the image reading apparatus 11, by a user.

In addition, in the image reading apparatus 11 which causes the reading units 31 and 32 to read an image of the document MS which is transported, when a transport speed of the document MS is low, image data with a high resolution is generated. For this reason, the first reading mode for providing image data with a high resolution to a user is a mode which transports the document MS at a speed which is related to a resolution desired by a user.

FIG. 3 illustrates an example of a table which denotes a plurality of (here, three) the first reading modes. As illustrated in FIG. 3, a first mode is a reading mode in which a transport speed of the document MS is high, and image data with a low resolution is generated. A second mode is a reading mode in which a transport speed of the document MS is at an intermediate level, and image data with an intermediate resolution is generated. A third mode is a reading mode in which a transport speed of the document MS is low, and image data with a high resolution is generated.

In addition, a user can select one reading mode (that is, first reading mode) from the three modes when instructing reading of an image to the image reading apparatus 11.

Here, in the image reading apparatus 11 according to the embodiment, it is possible to execute reading of images of various documents MS with different thickness. In addition, when the document MS is thin, a transport failure such as paper jam easily occurs in the middle of transporting. In order to suppress such a transport failure, it is desirable to transport the document MS at a low speed.

Therefore, as described above, the specifying button 51A is provided in the user interface 50. The specifying button 51A is a button which is set to the ON-state when reading an image of a document MS in which a transport failure easily occurs in the middle of transporting, such as a thin document MS, for example. In addition, when the specifying button 51A is set to the ON-state through an operation by a user, specific setting information which is information related to a specific user operation is input to a control device 60 (refer to FIG. 4) as a control unit of the image reading apparatus 11, and the second reading mode which is different from the first reading mode is executed. In addition, the "specific user operation" here, is a button operation by a user for setting the specifying button 51A to the ON-state.

That is, an operation of reading an image from a document MS when specific setting information is not input to the control device 60 is set to the first reading mode. In addition, an operation of reading an image from a document MS when specific setting information is input to the control device 60 is set to the second reading mode.

The second reading mode is a mode for generating data of an image with the same resolution as that in the first reading mode while transporting a document MS at a lower speed than that in the first reading mode.

For example, when the specifying button 51A is set to the ON-state under a circumstance in which executing of the first mode is selected by a user, that is, a circumstance in which a resolution desired by a user is a low resolution, the following second reading mode is executed.

A document MS is transported at a lower speed than that in the first mode. For example, transporting is performed at a transport speed of the document MS in the third mode, or a speed corresponding to the transport speed.

Image data with the same resolution as that in the first mode is generated.

In addition, when the specifying button 51A is set to the ON-state under a circumstance in which executing of the third mode is selected by a user, that is, a circumstance in which a resolution desired by a user is a high resolution, the following second reading mode is executed.

A document MS is transported at a lower speed than that in the third mode.

Image data with the same resolution as that in the third mode is generated.

Since a document MS is transported at a low speed by executing such a second reading mode, the occurrence of a transport failure of a document MS is suppressed, even when reading an image of the document MS which is thin. Moreover, even when a document MS is transported at a low speed in this manner, a resolution of an image based on image data which is generated becomes a resolution desired by a user, that is, a resolution which is equal to that in a case of the first reading mode which is selected by a user.

Figure 4:
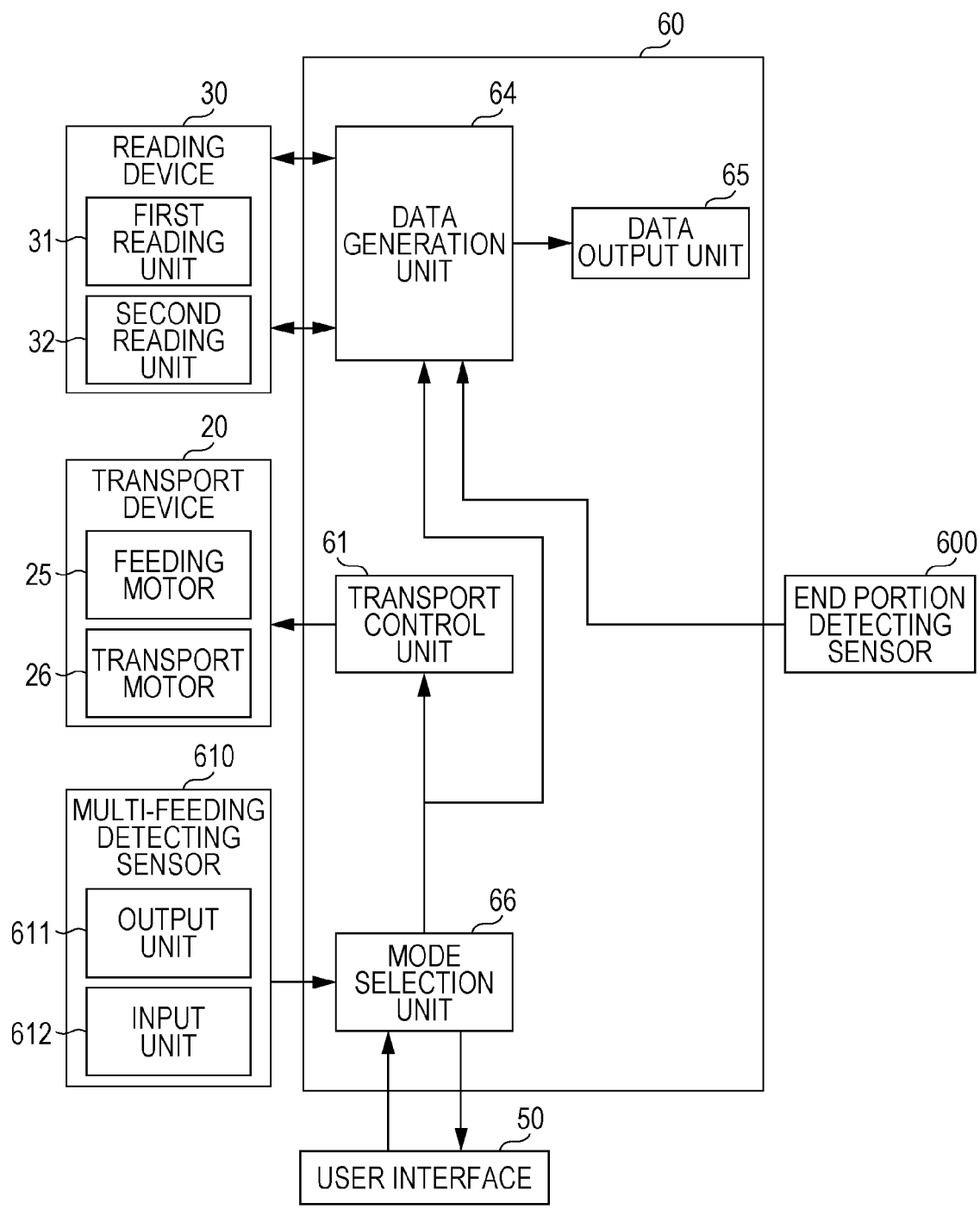
FIG. 4 is a block diagram which describes a functional configuration of the image reading apparatus.

Subsequently, the control device 60 of the image reading apparatus 11 will be described with reference to FIG. 4.

The control device 60 includes a microcomputer which is configured of a CPU, a ROM, and the like, and various driver circuits. As illustrated in FIG. 4, such a control device 60 includes a transport control unit 61, a mode selection unit 66, a data generation unit 64, and a data output unit 65 as functional units which are configured of at least one of software and hardware.

The transport control unit 61 controls the transport device 20. That is, when a transport start instruction of a document MS, that is, when an instruction of reading an image of a document MS is input, the transport control unit 61 rotates the feeding roller 21 by driving the feeding motor 25. In this manner, one document MS is fed into the housing 12 from the setting unit 14. In addition, the transport control unit 61 stops driving of the feeding motor 25 when the document MS, which is transported using a rotation of the feeding roller 21, is interposed between two rollers 221 and 222 which configure the pair of feeding rollers 22.

In addition, the transport control unit 61 rotates each roller 221, 231, 241, 222, 232, and 242 of the pair of feeding rollers 22, the pair of transport rollers 23, and pair of discharging rollers 24 by driving the transport motor 26. In addition, a driving start timing of the transport motor 26 may be the same as a timing of starting driving of the feeding motor 25, and may be later than the timing of starting driving of the feeding motor 25. In addition, the transport control unit 61 stops driving of the transport motor 26 after a timing in which a rear end of a document MS passes through the pair of discharging rollers 24.

In addition, information related to a transport speed of a document MS is input to the transport control unit 61 from the mode selection unit 66. In addition, the transport control unit 61 controls driving of the transport motor 26 so that the document MS is transported at a speed based on the input information.

The mode selection unit 66 determines a reading mode to be executed based on user information which is input when executing reading of an image. That is, the mode selection unit 66 selects the first reading mode corresponding to a resolution of an image which is desired by a user (refer to FIG. 3) when information for specifying a resolution of an image is input from the user interface 50 or an external device. For example, when a user desires an image with a high resolution, the mode selection unit 66 selects the third mode. In addition, the mode selection unit 66 outputs information related to the selected reading mode to the transport control unit 61 and the data generation unit 64. In addition, the mode selection unit 66 selects the second reading mode when the specifying button 51A is in the ON-state, and outputs information related to the reading mode to the transport control unit 61 and the data generation unit 64.

The data generation unit 64 controls each of the reading units 31 and 32 of the reading device 30, and obtains images which are read by each of the reading units 31 and 32. In addition, the data generation unit 64 generates image data as data of images which are read by the reading units 31 and 32, and outputs the image data to the data output unit 65.

A resolution of an image based on image data which is generated at this time is a resolution corresponding to information related to a resolution which is input from the mode selection unit 66. That is, when the specifying button 51A is in the OFF-state, the data generation unit 64 generates data of an image with a resolution corresponding to a transport speed of a document MS. On the other hand, when the specifying button 51A is in the ON-state, the data generation unit 64 generates data of an image with a resolution which is desired by a user, even when a transport speed of a document MS is low.

Here, obtaining an image from a document MS is executed by causing the reading units 31 and 32 to read an image at each predetermined timing when the document MS is transported. For this reason, the lower the transport speed of a document MS, the higher the resolution of an image which is obtained by the reading units 31 and 32. For this reason, there is a concern that a resolution of an image which is obtained when executing the second reading mode may be higher than a resolution which is desired by a user. Therefore, the data generation unit 64 lowers a resolution of an obtained image to a resolution which is desired by a user, and generates data of an image with the same resolution in the second reading mode.

In addition, when executing the second reading mode, the data generation unit 64 may control the reading units 31 and 32 so that it is possible to obtain an image with a low resolution (that is, image with resolution which is obtained when assuming that first reading mode is executed). For example, it is possible to obtain an image with a resolution which is lower than a resolution corresponding to a transport speed of a document MS, by delaying the above described predetermined timing. In this case, the data generation unit 64 can generate data of an image with a resolution which is desired by a user, even when a transport speed of the document MS is low. That is, it is not necessary to perform a process of lowering a resolution of an obtained image.

The data output unit 65 transmits image data which is generated in the data generation unit 64 to an external device.

Subsequently, a processing procedure when reading an image of a document MS will be described with reference to the flowchart illustrated in FIG. 5.

Figure 5:
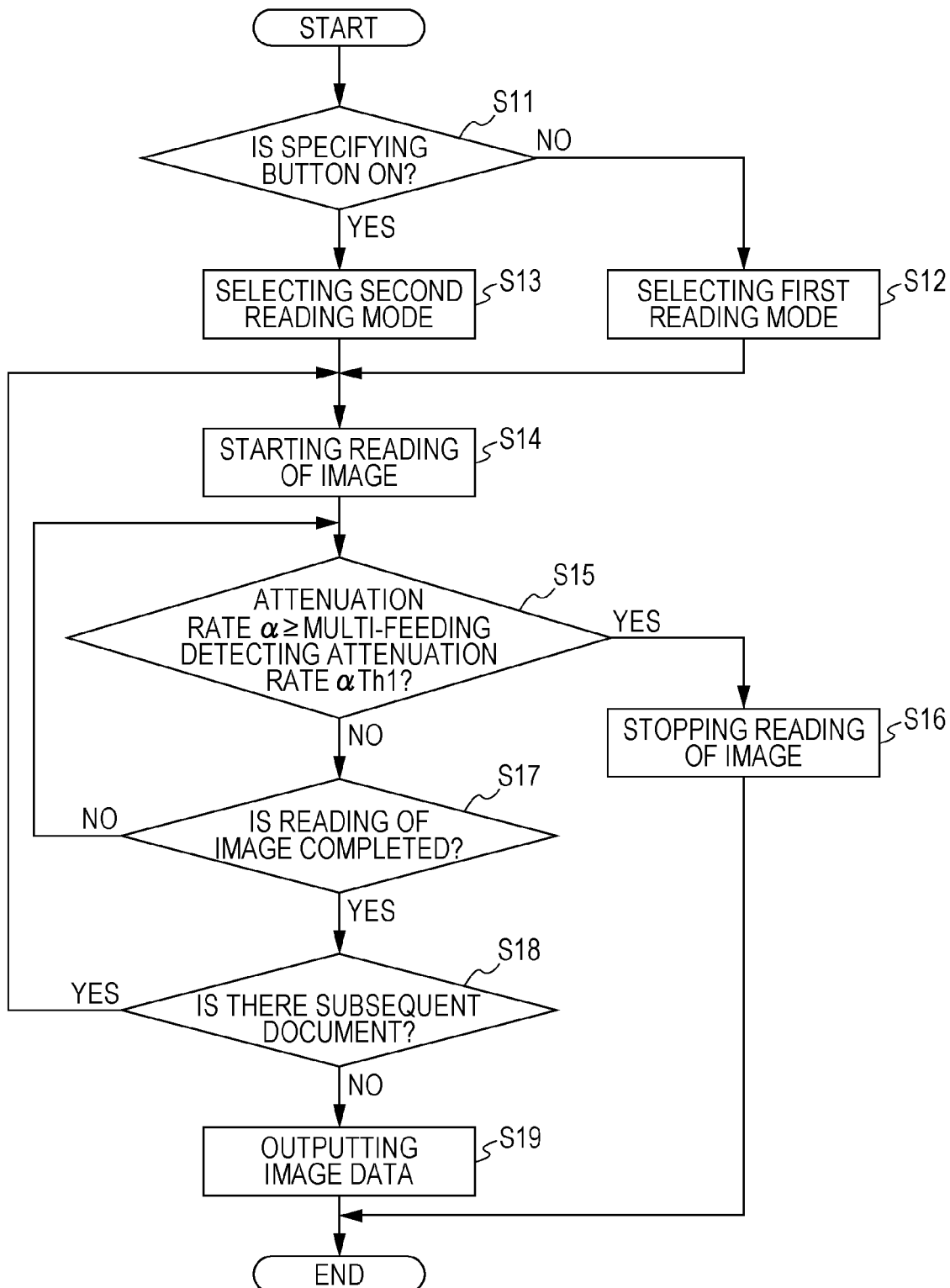
FIG. 5 is a flowchart which describes a processing procedure when performing reading of an image using the image reading apparatus.

As illustrated in FIG. 5, whether or not the specifying button 51A is in the ON-state is determined under a circumstance in which any one mode of the first mode, the second mode, and the third mode is selected (step S11). When the specifying button 51A is in the OFF-state, (No in step S11), the first reading mode (step S12) is selected, and the process proceeds to step S14 which will be described later. On the other hand, when the specifying button 51A is in the ON-state (Yes in step S11), the second reading mode (step S13) is selected, the specifying lamp 52A is turned on, and the process proceeds to the subsequent step S14.

In step S14, when the selected reading mode is started to be executed, reading of an image is started. For example, when the specifying button 51A is in the OFF-state, and the second mode is selected, a document MS is transported at an intermediate speed by the transport device 20, and data of an image with an intermediate resolution is generated. In addition, when the specifying button 51A is in the ON-state, and the second mode is selected, a document MS is transported at a low speed by the transport device 20, and image data of an image with an intermediate resolution is generated.

In addition, whether or not an attenuation rate α which is detected using the multi-feeding detecting sensor 610 is the multi-feeding detecting attenuation rate αTh1 or more is determined in the middle of performing reading of an image in this manner (step S15). The multi-feeding detecting attenuation rate αTh1 is a threshold value for determining whether or not a plurality of documents MS are transported by being overlapped. For example, it is assumed that an attenuation rate α when only one document MS with a normal thickness is transported, and the document MS is located between the output unit 611 and the input unit 612 of the multi-feeding detecting sensor 610 is set to a "standard attenuation rate". In this case, the multi-feeding detecting attenuation rate αTh1 is set to a value which is larger than the standard attenuation rate.

In addition, when the attenuation rate α is larger than the multi-feeding detecting attenuation rate αTh1 (Yes in step S15), reading of an image is stopped (step S16), since it is possible to determine that a plurality of documents MS are transported by being overlapped. In this case, transporting of the document MS is stopped, and the error is notified to a user using the user interface 50. Thereafter, the process is finished.

Meanwhile, when the attenuation rate α is less than the multi-feeding detecting attenuation rate αTh1 (No in step S15), reading of the image is continued, since it is possible to determine that only one document MS is transported. In addition, whether or not reading of the image is completed is determined (step S17).

In addition, it is possible to detect a rear end of a document MS based on a reading result using the reading units 31 and 32. That is, it is possible to determine whether or not the rear end of the document MS is located on the downstream side in the transport direction of the reading units 31 and 32 based on a reading result using the reading units 31 and 32. In addition, it is possible to determine that reading of the image of the document MS is completed when the rear end of the document MS is located on the downstream side in the transport direction of the reading units 31 and 32.

When reading of the image of the document MS is not completed (No in step S17), the process proceeds to the above described step S15, and reading of the image is continued. On the other hand, when reading of the image of the document MS is completed (Yes in step S17), the process proceeds to the subsequent step S18.

In step S18, whether or not there is the subsequent document MS of which an image is to be read is determined. When there is the subsequent document MS (Yes in step S18), the process proceeds to the above described step S14, and transporting of the subsequent document MS is started. In this case, a transport speed of the subsequent document MS is the same as that in the previous document MS. Meanwhile, when there is not the subsequent document MS (No in step S18), image data which is generated by the data generation unit 64 is output using the data output unit 65 (step S19), and the process is finished.

In addition, when continuously reading images of a plurality of documents MS, there is a case in which the specifying button 51A is operated by a user in the middle of continuous reading of a series of images. In the image reading apparatus 11 according to the embodiment, such an operation of the specifying button 51A by a user is set to be invalid.

That is, even when the specifying button 51A is operated in the middle of continuous reading of images, a transport speed of one document and a transport speed of the subsequent document are set to be equal. In other words, an operation of the specifying button 51A before starting continuous reading of a series of images, that is, before starting a process which is described using FIG. 5 is set to be valid.

As described above, in the image reading apparatus 11 according to the embodiment, it is possible to obtain the following effects.

(1) When reading of an image is instructed under a circumstance in which the specifying button 51A is in the OFF-state, the first reading mode is executed. That is, when a user recognizes that a document MS which is set in the setting unit 14 is not thin, reading of an image is instructed by a user with respect to the image reading apparatus 11 without setting the specifying button 51A to the ON-state. At this time, a resolution of an image based on generated image data can be selected by a user when the user inputs an instruction of reading. For this reason, a document MS is transported at a transport speed corresponding to a resolution of an image which is desired by a user, and data of the image with the resolution which is desired by the user is generated. Accordingly, it is possible to provide a user with data of an image with a resolution which is desired by the user.

On the other hand, when reading of an image is instructed under a circumstance in which the specifying button 51A is in the ON-state, the second reading mode is executed. That is, when a user recognizes that a document MS which is set in the setting unit 14 is thin, reading of an image is instructed by a user with respect to the image reading apparatus 11 after setting the specifying button 51A to the ON-state. At this time, although the document MS is transported at a speed which is lower than that in the first reading mode, data of an image with the same resolution as that in the first reading mode is generated. That is, it is possible to provide image data which is independent from a transport speed of a document MS to a user while suppressing a transport failure such as paper jam. Accordingly, it is possible to generate data of an image with a resolution which is desired by a user, even when a transport speed of a document MS is variable.

Second Embodiment

Subsequently, a second embodiment in which an image reading apparatus 11 is embodied will be described according to FIG. 6. In addition, in the second embodiment, a part of processing procedure when the specifying button 51A is in the ON-state is different from that in the first embodiment. Accordingly, in the following descriptions, parts which are different from those in the first embodiment will be mainly described, and the same constituent elements as those in the first embodiment are given the same reference numerals, and redundant descriptions will be omitted.

Figure 6:
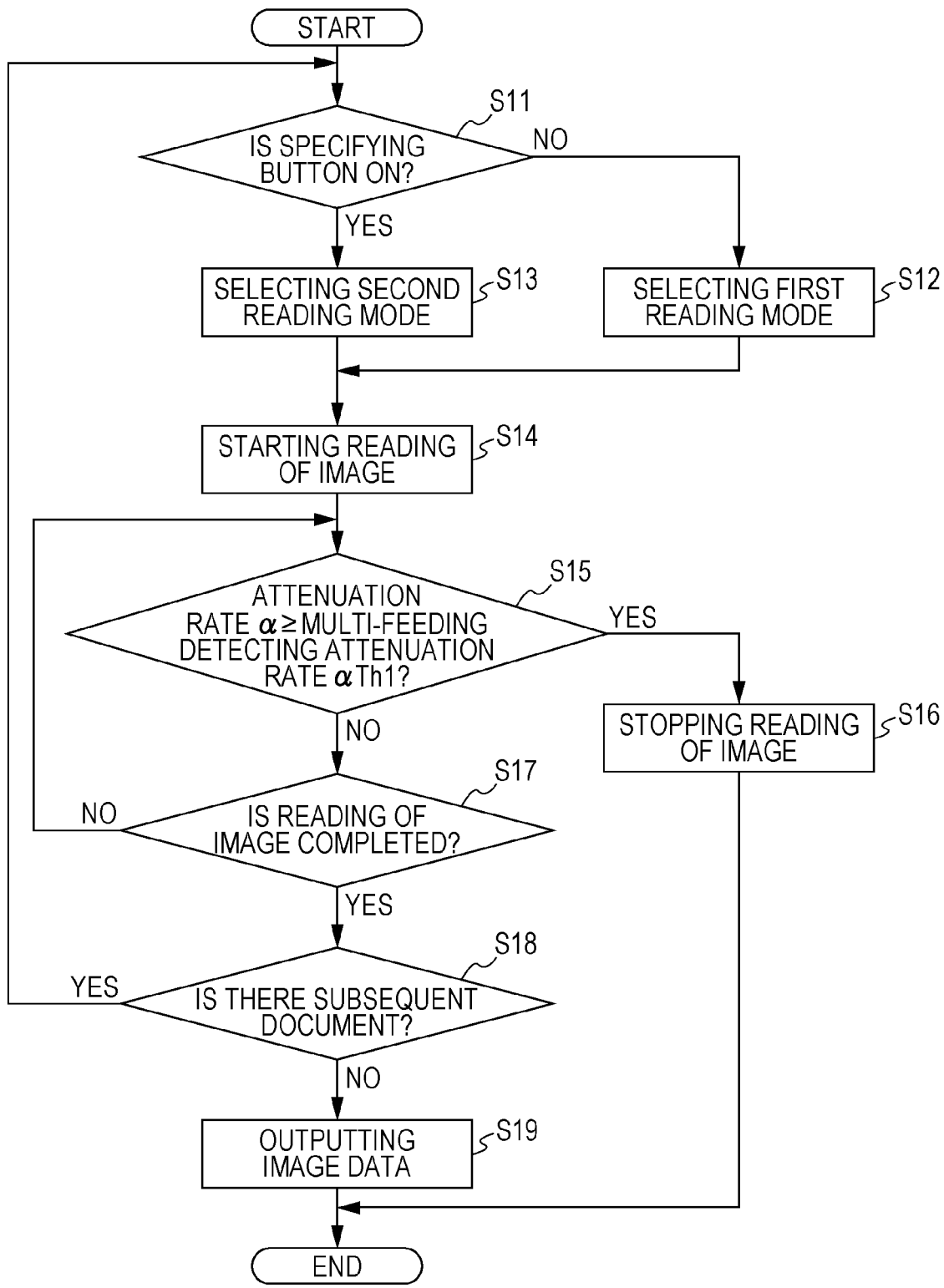
FIG. 6 is a flowchart which describes a processing procedure when performing reading of an image using an image reading apparatus according to a second embodiment.

In FIG. 6, a flowchart for describing a processing procedure when performing reading of an image of a document MS is illustrated.

As illustrated in FIG. 6, whether or not the specifying button 51A is in the ON-state is determined under a circumstance in which any one mode of the first mode, the second mode, and the third mode is selected (step S11). When the specifying button 51A is in the OFF-state (No in step S11), the first reading mode is selected (step S12), and the process proceeds to step S14 which will be described later. On the other hand, when the specifying button 51A is in the ON-state (Yes in step S11), the second reading mode is selected (step S13), and the process proceeds to the subsequent step S14.

In step S14, reading of an image is started when the selected reading mode is started to be executed. In addition, when an attenuation rate α which is detected using the multi-feeding detecting sensor 610 is the multi-feeding detecting attenuation rate αTh1 or more in the middle of performing reading of the image in this manner (Yes in step S15), since it is possible to determine that a plurality of documents MS are transported by being overlapped, reading of the image is stopped (step S16). In this case, transporting of the document MS is stopped, and the error is notified to a user using the user interface 50. For example, the specifying lamp 52A is turned on. Thereafter, the process is finished.

Meanwhile, when the attenuation rate α is less than the multi-feeding detecting attenuation rate αTh1 (No in step S15), since it is possible to determine that only one document MS is transported, reading of the image is continued. In addition, when reading of the image of the document MS is not completed (No in step S17), the process proceeds to the above described step S15, and reading of the image of the document MS is continued. On the other hand, when reading of the image of the document MS is already completed (Yes in step S17), the process proceeds to the subsequent step S18.

In step S18, whether or not there is the subsequent document MS of which an image is to be read is determined. When there is no subsequent document MS (No in step S18), image data which is generated by the data generation unit 64 is output using the data output unit 65 (step S19), and the process is finished.

On the other hand, when there is the subsequent document MS (Yes in step S18), the process proceeds to the above described step S11, and transporting of the subsequent document MS is started. That is, when the specifying button 51A is changed in the middle of reading the previous image, even though a transport speed of the document MS is changed from reading of the image of this time, a resolution of the image based on a generated image mode is the same as that when reading the previous image.

For example, when the specifying button 51A is changed from the OFF-state to the ON-state in the middle of reading the previous image, the first reading mode is executed when reading the previous image, but in contrast to this, the second reading mode is executed when reading the image of this time. That is, when starting reading of the image of this time, a mode to be executed is switched from the first reading mode to the second reading mode.

On the other hand, when the specifying button 51A is changed from the ON-state to the OFF-state in the middle of reading the previous image, the second reading mode is executed when reading the previous image, but in contrast to this, the first reading mode is executed when reading the image of this time. That is, when setting information which denotes ending of the second reading mode is input under a circumstance in which the second reading mode is selected, a mode to be executed is switched from the second reading mode to the first reading mode when starting reading of the image of this time. Accordingly, in the image reading apparatus 11 according to the embodiment, changing of the specifying button 51A from the ON-state to the OFF-state due to an operation of the specifying button 51A by a user corresponds to a "predetermined ending condition".

As described above, according to the image reading apparatus 11 in the embodiment, it is possible to obtain the following effects, in addition to the same effect as the effect (1) in the above described first embodiment.

(2) When the specifying button 51A is set to the ON-state in the middle of transporting one document in each document MS, when continuously reading images of a plurality of documents MS, executing of the first reading mode is continued until reading of an image of the one document is completed. That is, a reading mode is not changed in the middle of transporting one document, and a transport speed of the document is not changed. For this reason, it is possible to suppress an increase in control load which is caused by switching of a reading mode in the middle of reading an image.

Thereafter, when reading an image of the subsequent document, the second reading mode is executed instead of the first reading mode. That is, when reading an image of a document after one document, the document is transported at a low speed. Moreover, since the second reading mode is executed, even when the document is transported at a low speed, data of an image with the same resolution as that in the first reading mode is generated. Accordingly, even when reading an image of a document after the one document, it is possible to provide image data which is independent from a transport speed to a user while suppressing an occurrence of a transport failure of a document MS by transporting the document MS at a low speed.

(3) However, when switching of the specifying button 51A from the ON-state to the OFF-state is performed at a time of executing reading of an image of a document MS in the second reading mode, it is possible to determine that a condition for ending executing of the second reading mode is satisfied. For this reason, when reading an image of the subsequent document MS, the first reading mode is executed, and the document MS is transported at a speed which is defined by the first reading mode. Accordingly, when it is not necessary to execute the second reading mode, it is possible to appropriately perform switching from the second reading mode to the first reading mode.

Third Embodiment

Figure 7:
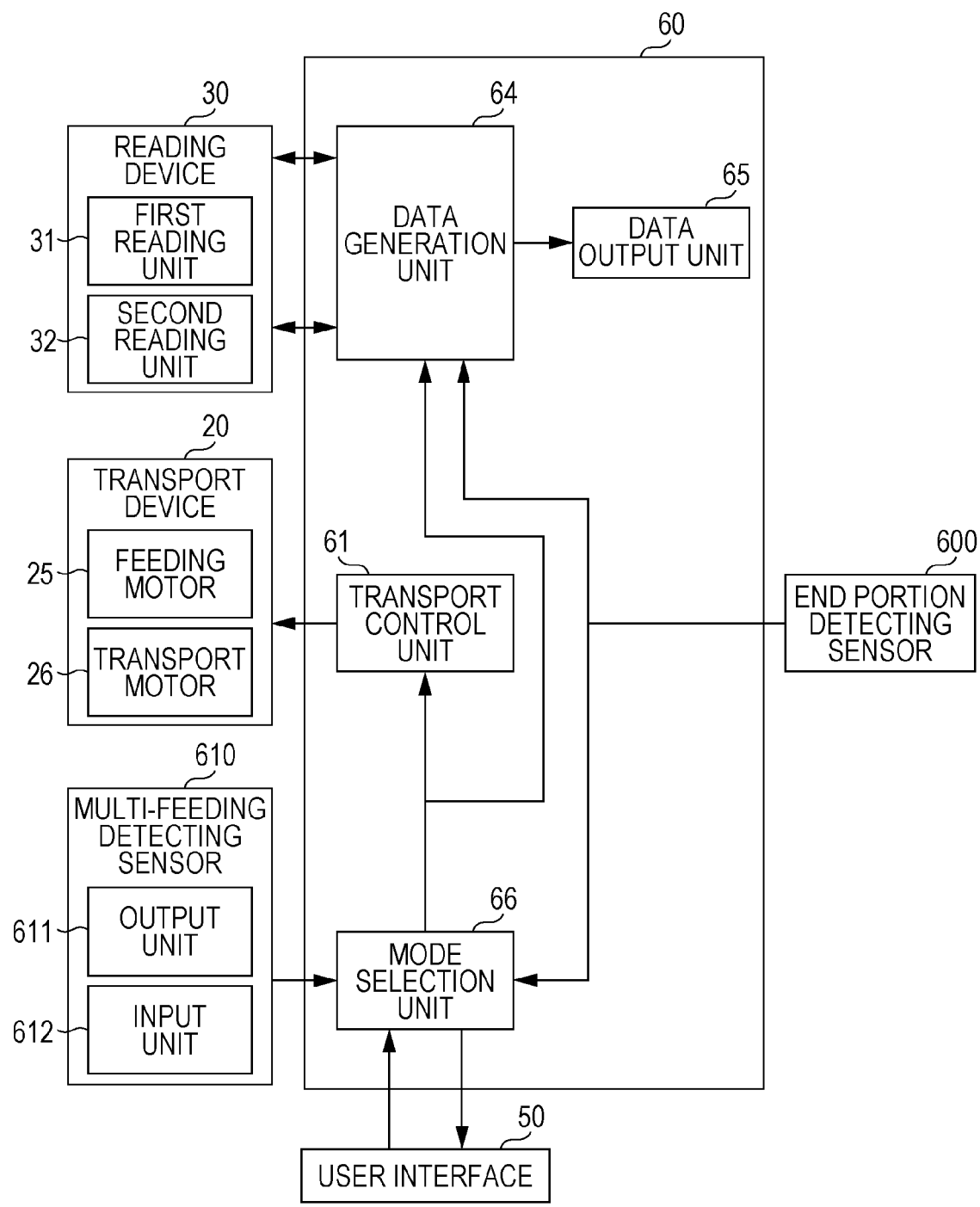
FIG. 7 is a block diagram which describes a functional configuration of an image reading apparatus according to a third embodiment.

Subsequently, a third embodiment in which an image reading apparatus 11 is embodied will be described with reference to FIGS. 7 and 8. In addition, in the third embodiment, a point of automatically detecting a thickness of a document MS as a reading target of an image, and determining whether to perform the second reading mode or the first reading mode based on the detection result is different from each of the first and second embodiments. Accordingly, in the following descriptions, parts which are different from those in the first and second embodiments will be mainly described, the same constituent elements as those in the first and second embodiment are given the same reference numerals, and redundant descriptions will be omitted.

A control device 60 of the image reading apparatus 11 will be described with reference to FIG. 7.

The control device 60 includes a microcomputer which is configured of a CPU, a ROM, and the like, and various driver circuits. As illustrated in FIG. 7, such a control device 60 includes a transport control unit 61, a mode selection unit 66, a data generation unit 64, and a data output unit 65 as functional units which are configured of at least one of software and hardware.

The mode selection unit 66 determines whether or not a transported document MS is thin based on an attenuation rate α which is detected by the multi-feeding detecting sensor 610. In addition, when it is determined that the document MS is not thin, the mode selection unit 66 selects the first reading mode (refer to FIG. 3) corresponding to a resolution of an image which is desired by a user, and outputs information related to the selected first reading mode (for example, third mode) to the transport control unit 61 and the data generation unit 64. On the other hand, when it is determined that the document MS is thin, the mode selection unit 66 selects the second reading mode, and outputs information related to the selected second reading mode to the transport control unit 61 and the data generation unit 64.

Here, an example of a method of determining whether or not a transported document MS is thin will be described.

That is, when a document MS is located between an output unit 611 and an input unit 612 of the multi-feeding detecting sensor 610, a sonic wave which is output from the output unit 611 is input to the input unit 612 by passing through the document MS. At this time, the thinner the document MS, the sonic wave is rarely attenuated when the sonic wave penetrates the document MS. That is, it is possible to approximately assume a thickness of a document MS based on an attenuation rate α of a sonic wave. Accordingly, a determining attenuation rate αTh2 is provided as an attenuation rate α as a standard for determining whether or not a document MS is thin, and it is determined that a document MS which is transported is thin, when the attenuation rate α is less than the determining attenuation rate αTh2.

In addition, there is a case in which a plurality of thin documents MS are transported by being overlapped. For example, when two documents MS are overlapped, an attenuation rate α which is detected using the multi-feeding detecting sensor 610 becomes larger than an attenuation rate when one document MS which is not thin is transported. For this reason, the multi-feeding detecting attenuation rate αTh1 is set to a value which is larger than the attenuation rate when one document MS which is not thin is transported. In this manner, when an attenuation rate α is the determining attenuation rate αTh2 or more, and less than the multi-feeding detecting attenuation rate αTh1, it is possible to determine that the transported document MS is not thin. Meanwhile, when an attenuation rate α is the multi-feeding detecting attenuation rate αTh1 or more, it is possible to determine that a plurality of documents MS are transported by being overlapped.

Figure 8:
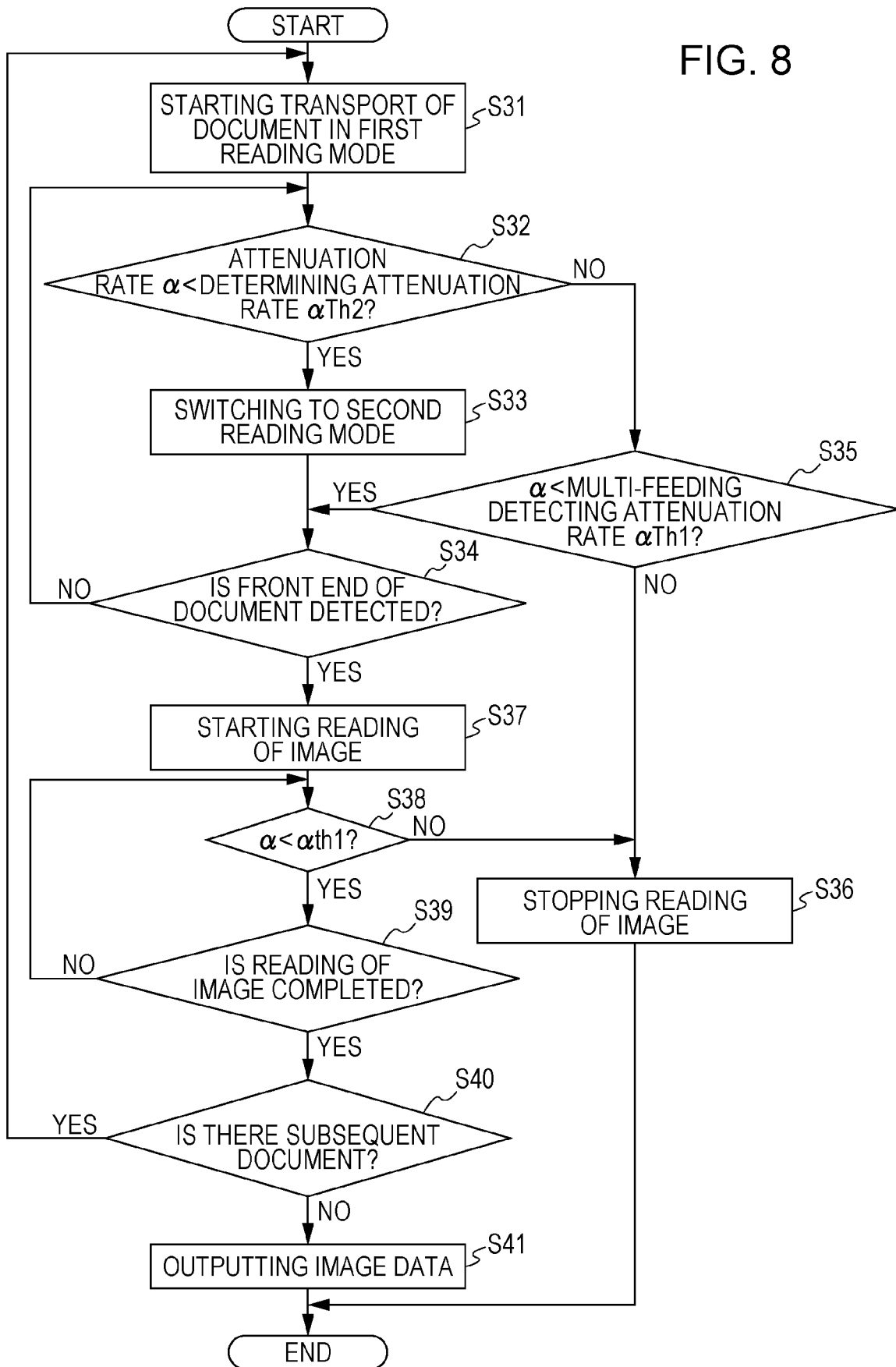
FIG. 8 is a flowchart which describes a processing procedure when performing reading of an image using the image reading apparatus.

Subsequently, a processing procedure when reading an image of a document MS will be described with reference to the flowchart which is illustrated in FIG. 8.

As illustrated in FIG. 8, transporting of a document MS in the first reading mode corresponding to a resolution of an image which is desired by a user is started (step S31). In addition, when the document MS is located between the output unit 611 and the input unit 612 of the multi-feeding detecting sensor 610, whether or not an attenuation rate α which is detected using the multi-feeding detecting sensor 610 is less than the determining attenuation rate αTh2 is determined (step S32). That is, in step S32, whether or not a document MS which is transported is thin is determined.

In addition, when the attenuation rate α is less than the determining attenuation rate αTh2 (Yes in step S32), it is determined that a thin document MS is transported, and a reading mode is switched from the first reading mode to the second reading mode (step S33). Due to this, a transport speed of the document MS is lowered. When the second reading mode is executed in this manner, the specifying lamp 52A is turned on. In addition, the process proceeds to the subsequent step S34.

In step S34, whether or not the front end of the document MS is detected is determined using the end portion detecting sensor 600. When the front end of the document MS is not detected yet (No in step S34), the process proceeds to the above described step S32. On the other hand, when the front end of the document MS is detected (Yes in step S34), the process proceeds to the step S37 which will be described later. That is, when the front end of the document MS passes through the end portion detecting sensor 600, and reaches in front of the reading device 30, changing of a reading mode is prohibited, and a transport speed of a document MS is not changed.

Meanwhile, when the attenuation rate α is the determining attenuation rate αTh2 or more in step S32 (No), since it is possible to determine that a document MS which is transported is not thin, whether or not the attenuation rate α is less than the multi-feeding detecting attenuation rate αTh1 is determined (step S35). In step S35, whether or not a plurality of documents MS are transported by being overlapped is determined. In addition, when the attenuation rate α is less than the multi-feeding detecting attenuation rate αTh1 (Yes in step S35), since it is possible to determine that one document MS which is not thin is transported, the process proceeds to the above described step S34. In this case, an image is read by the reading units 31 and 32 while transporting the document MS at a transport speed which is defined in the first reading mode. In addition, when the document MS is transported in the first reading mode in this manner, the specifying lamp 52A is turned off.

Meanwhile, when the attenuation rate α is the multi-feeding detecting attenuation rate αTh1 or more (No in step S35), since it is possible to determine that a plurality of documents MS are transported by being overlapped, reading of an image is stopped (step S36). In this case, transporting of the documents MS is stopped, and the error is notified to a user using the user interface 50. Thereafter, the process is finished.

In step S37, reading of an image of a document MS which is transported is started. In addition, whether or not an attenuation rate α which is detected in the middle of reading of an image using the multi-feeding detecting sensor 610 in this manner is less than the multi-feeding detecting attenuation rate αTh1 is determined (step S38). When the attenuation rate α is the multi-feeding detecting attenuation rate αTh1 or more (No in step S38), since it is possible to determine that a plurality of documents MS are transported by being overlapped, the process proceeds to the above described step S36. That is, when it is detected that a plurality of documents MS are transported by being overlapped, reading of an image which is in the middle of being executed is stopped.

Meanwhile, when the attenuation rate α is less than the multi-feeding detecting attenuation rate αTh1 (Yes in step S38), whether or not reading of an image of a document MS which is transported is completed is determined (step S39). When reading of the image is not completed yet (No in step S39), the process proceeds to the above described step S38, and reading of the image is continued. On the other hand, when reading of the image is completed (Yes in step S39), the process proceeds to the subsequent step S40.

In step S40, whether or not there is the subsequent document MS of which an image is to be read is determined. When there is the subsequent document MS (Yes in step S40), the process proceeds to the above described step S31, and transporting of the subsequent document MS is started. In this case, transporting of a document MS in the first reading mode is started even after reading of an image in the second reading mode. That is, a completion of reading of an image of a document MS corresponds to a "predetermined ending condition" for switching from the second reading mode t the first reading mode.

On the other hand, when there is not the subsequent document MS (No in step S40), image data which is generated by the data generation unit 64 is output to the data output unit 65 (step S41), and the process is finished.

As described above, according to the image reading apparatus 11 in the embodiment, it is possible to obtain the following effects.

(4) When the document MS which is transported by the transport device 20 is not thin, the first reading mode is executed. In addition, a resolution of an image based on image data which is generated when a user instructs reading of a document MS to the image reading apparatus 11 can be selected by the user. For this reason, it is possible to provide a user with image data as image data which is desired by the user.

On the other hand, when a document MS which is transported by the transport device 20 is thin, the second reading mode is executed. In this case, though the document MS is transported at a lower speed than that in the first reading mode, data of an image with the same resolution as that in the first reading mode is generated. That is, it is possible to provide image data which is independent from a transport speed of a document MS to a user while suppressing a transport failure such as paper jam. Accordingly, it is possible to generate image data with a resolution which is desired by a user even when a transport speed of a document MS is variable.

(5) In the image reading apparatus 11 according to the embodiment, when an attenuation rate α of a sonic wave which is detected using the multi-feeding detecting sensor 610 is less than the determining attenuation rate αTh2, the second reading mode is executed, since it is possible to determine that a document MS which is transported is thin. It is possible to execute the second reading mode by automatically selecting the mode, using a detection result using the multi-feeding detecting sensor 610 in this manner.

(6) The multi-feeding detecting attenuation rate αTh1 which is a threshold value for determining whether or not a plurality of documents MS are transported by being overlapped is determined to be a value which is larger than the determining attenuation rate αTh2. In addition, it is possible to determine whether only one document which is not thin is transported, or a plurality of documents are transported by being overlapped using the multi-feeding detecting attenuation rate αTh1. In addition, it is possible to appropriately drive the image reading apparatus 11 according to a circumstance by adopting such a determination result.

(7) The multi-feeding detecting sensor 610 is arranged between the pair of transport rollers 23 and the pair of feeding rollers 22 in the transport direction. For this reason, it is possible to determine whether or not a document MS which is transported is thin before the front end of the document MS reaches a position of the reading device 30. For this reason, it is possible to determine whether to switch a reading mode from the first reading mode to the second reading mode, or to continue the first reading mode before actually starting reading of an image using the reading units 31 and 32. Accordingly, a transport speed of a document MS may not be changed in the middle of actual reading of an image using the reading units 31 and 32.

(8) In addition, when transporting of a document MS in the second reading mode is finished, transporting of a document MS in the first reading mode is started since an ending condition of the second reading mode is satisfied. For this reason, when a part of documents MS is thin at a time of continuously reading the plurality of documents MS, it is possible to transport the document at a low speed only when reading an image of the document which is thin. Accordingly, even when reading an image of a document which is not thin, it is possible to suppress a decrease in throughput of the image reading apparatus 11 compared to a case in which a document is transported at a low speed.

The above described each embodiment can be modified as follows.

According to the third embodiment, when the multi-feeding detecting sensor 610 is arranged on the upstream side of the reading device 30 in the transport direction, the multi-feeding detecting sensor 610 may be arranged at another position except for the position between the pair of feeding rollers 22 and the pair of transport rollers 23 in the transport direction. For example, the multi-feeding detecting sensor 610 may be arranged between the reading device 30 and the pair of transport rollers 23 in the transport direction.

A sensor other than the sonic wave sensor may be adopted as a multi-feeding detecting sensor, when the sensor can detect whether or not a document MS which is transported is thin, and whether or not a plurality of documents MS are transported by being overlapped.

A current value which flows in the transport motor 26 at a time of transporting a document MS becomes large when a load which is applied to pair of rollers which rotate using the transport motor 26 as a driving source is large. In addition, such a load is changed according to a thickness of a document MS which is transported, or the number of documents MS which are overlapped. Therefore, according to the second embodiment, whether or not a document MS which is transported is thin may be determined based on a current value which flows in the transport motor 26, instead of an attenuation rate α which is detected using the multi-feeding detecting sensor 610. Similarly, in each of the first and second embodiments, whether or not a plurality of documents MS are transported by being overlapped may be determined based on a current value which flows in the transport motor 26.

In each of the first and second embodiments, a user operation for selecting the second reading mode may be executed in an external device which can communicate with the image reading apparatus 11, instead of the user interface 50 of the image reading apparatus 11. In this case, the second reading mode is executed when specific setting information as information related to a user operation is received by the control device 60 of the image reading apparatus 11 from the external device.

In each of the first and second embodiments, when reading of an image in the second reading mode is finished, and reading of an image based on the subsequent job is executed, the first reading mode may be executed by setting the specifying button 51A to the OFF-state, state, and turning off the specifying lamp 52A. In this case, inputting of an instruction of reading an image to the control device 60 based on the subsequent job corresponds to an "ending condition".

In each of the above described embodiments, the second reading mode is executed when necessary, even when the third mode is selected by a user; however, it is not limited to this, and the second reading mode may not be executed when the third mode is selected. In this case, for example, in each of the first and second embodiments, when the third mode is selected, the third mode is executed whether the specifying button 51A is the ON-state, or the OFF-state. In addition, according to the third embodiment, when the third mode is selected, the third mode is executed even when an attenuation rate α of a sonic wave which is detected using the multi-feeding detecting sensor 610 is less than the determining attenuation rate αTh2.

In each of the first and second embodiments, when an attenuation rate α of a sonic wave which is detected using the multi-feeding detecting sensor 610 is the determining attenuation rate αTh2 or more, the first reading mode may be executed even when the specifying button 51A is in the ON-state. In addition, the second reading mode may be executed when the specifying button 51A is in the ON-state, and an attenuation rate α of a sonic wave which is detected using the multi-feeding detecting sensor 610 is less than the determining attenuation rate αTh2.

In addition, when the specifying button 51A is in the OFF-state, the first reading mode may be executed even when an attenuation rate α of a sonic wave which is detected using the multi-feeding detecting sensor 610 is less than the determining attenuation rate αTh2.

The reading device 30 may have a configuration of including any one of the first reading unit 31 and the second reading unit 32.

The transport device 20 may have a configuration of not including the feeding motor 25. In this case, the feeding roller 21 may be rotated by driving the transport motor 26.

When an image reading apparatus is an apparatus which generates image data related to an image of a document, and outputs the image data to an external device, the image reading apparatus may be realized in another apparatus such as a fax machine.

What is claimed is:

1. An image reading apparatus that reads an image of a document, the image reading apparatus comprising:
    a lower unit;
    an upper unit that is rotatably supported by the lower unit;
    a transport device comprising transport rollers that is configured to transport the document at a plurality of transport speeds;
    a reading device comprising first and second sensors that is configured to read the image of the document transported at a transport speed according to a resolution associated with a reading mode, wherein at least one of the transport speeds decreases when the resolution increases;
    a controller that is configured to accept an instruction to read the image of the document and generate image data of the image read by the reading device with the resolution, the controller being configured to select a low speed mode transporting the document at a low speed, the low speed mode comprising a setting to be set to one of an ON-state and an OFF-state, the setting being operated when instructing execution of the reading mode associated with the instruction, the setting changing to the low speed that is lower than a transport speed according to the resolution associated with the reading mode selected; and
    a user interface comprising at least a plurality of buttons and lamps that is provided in the upper unit and indicates a state which is under the low speed mode when the low speed mode is set to the ON-state,
    wherein the controller changes the transport speed to the low speed, without changing the resolution, when the reading of the document is instructed in a condition that the low speed mode is in the ON-state,
    wherein at least one of the transport speeds changes to the low speed in a condition that the low speed mode is in the ON-state.

2. The image reading apparatus according to claim 1, wherein the transport speed according to a highest resolution is not changed to the low speed in a condition that the low speed mode selection unit is in the ON-state.

3. The image reading apparatus according to claim 1, further comprising:
    a multi-feeding detecting sensor that detects a multi-feeding of documents transported by the transport device;
    wherein, in a condition that the low speed mode is in the ON-state, the controller stops the reading of the image when the multi-feeding detecting sensor detects the multi-feeding of documents, and then the controller executes a next reading of the image in a low speed mode when the low speed mode is kept on the ON-state.

4. The image reading apparatus according to claim 1, further comprising:
    an end portion detecting sensor that detects the document transported by the transport device before reading the image by the reading device,
    wherein the controller prohibits the changing of the low speed mode after a front end of the document passes through the end portion detecting sensor.

5. The image reading apparatus according to claim 1, wherein the controller disables the low speed mode section unit in the middle of a continuous reading of a series of images when continuously reading images of a plurality of documents.

6. The image reading apparatus according to claim 1, wherein the controller changes only the transport speed when the low speed mode selection unit is set to the ON-state by the user.

7. The image reading apparatus according to claim 1, wherein the controller switches a reading mode to be executed from the second reading mode to the first reading mode, when a predetermined ending condition is satisfied under a circumstance in which the second reading mode is selected.

8. The image reading apparatus according to claim 1, wherein the controller switches a reading mode to be executed at a time of reading the subsequent image from the second reading mode to the first reading mode, when setting information for ending the second reading mode is input under a circumstance in which the second reading mode is selected.

9. The image reading apparatus according to claim 1, wherein the controller switches a reading mode to be executed from the second reading mode to the first reading mode, when starting reading of an image based on the subsequent job under a circumstance in which the second reading mode is selected.

10. An image reading method that reads an image of a document, the image reading method comprising:
    a transporting step of transporting the document at a plurality of transport speeds;
    a reading step of reading the image of the document transported at a transport speed according to a resolution associated with a reading mode, wherein at least one of the transport speeds decreases when the resolution increases,
    a low speed mode executing step of executing a low speed mode transporting the document at a low speed, the low speed mode comprising a setting to be set to one of an ON-state and an OFF-state, the setting being independent of the reading mode associated with the instruction to read the image of the document, the setting changing to the low speed that is lower than a transport speed according to the resolution associated with the reading mode selected; and
    an indicating step of indicating a state which is under the low speed mode when the low speed mode is set to the ON-state,
    wherein the low speed mode executing step changes the transport speed to a low speed, without changing the resolution, when the reading of the document is instructed in a condition that the low speed mode is in the ON-state,
    wherein at least one of the transport speeds changes to the low speed in a condition that the low speed mode is in the ON-state.

* * * * *